US005690303A

United States Patent [19]
Winters

[11] Patent Number: 5,690,303
[45] Date of Patent: Nov. 25, 1997

[54] SELF-STABILIZING BASE FOR A TABLE

[75] Inventor: Henry Winters, Columbia, S.C.

[73] Assignee: Winters-Gresham Partnership, Columbia, S.C.

[21] Appl. No.: 669,626

[22] Filed: Jun. 24, 1996

[51] Int. Cl.⁶ .................................................. F16M 11/24
[52] U.S. Cl. .................................. 248/188.3; 248/188.7; 248/346.05
[58] Field of Search ........................ 248/188.2, 188.3, 248/188.4, 188.7, 346.05, 346.06, 188.8, 371, 133, 571; 312/251.4, 251.3, 251.8, 251.9; 108/137

[56] References Cited

U.S. PATENT DOCUMENTS

| 467,811 | 1/1892 | Humphreys . | |
|---|---|---|---|
| 2,245,713 | 6/1941 | Redmond | 248/188.3 |
| 2,546,097 | 3/1951 | Hild . | |
| 2,787,087 | 4/1957 | Whitman . | |
| 2,793,468 | 5/1957 | Mooser . | |
| 3,117,392 | 1/1964 | Junkunc . | |
| 3,167,290 | 1/1965 | Beckwell . | |
| 3,185,423 | 5/1965 | Jones | 248/18.3 |
| 3,204,906 | 9/1965 | Henderson . | |
| 3,278,147 | 10/1966 | Clarke | 248/188.8 |
| 3,814,362 | 6/1974 | Ritche . | |

FOREIGN PATENT DOCUMENTS

| 1518564 | 2/1968 | France | 248/188.2 |
|---|---|---|---|
| 94552 | of 0000 | Germany | 248/188.2 |
| 28578 | 10/1907 | United Kingdom | 248/188.2 |

Primary Examiner—Ramon O. Ramirez
Assistant Examiner—Gwendolyn W. Baxter
Attorney, Agent, or Firm—Michael A. Mann, P.A.

[57] ABSTRACT

A base for supporting an object such as a café table and the like on uneven flooring includes a central support to which are attached two leg assemblies, one rigidly attached and one rotatably attached to opposing faces on the central support. The rotatable leg assembly includes a bolt through an elongaged hole in the leg assembly and a hole through the face of the central support that allow some rotation but limit excessive rotation. Each leg assembly is composed of two angled legs interconnected by a section that is substantially planar so as to complement the face formed on the central support. A frictional pad between the central support and the leg assembly is used to resist rotation of the central support with respect to the rotating leg.

18 Claims, 2 Drawing Sheets

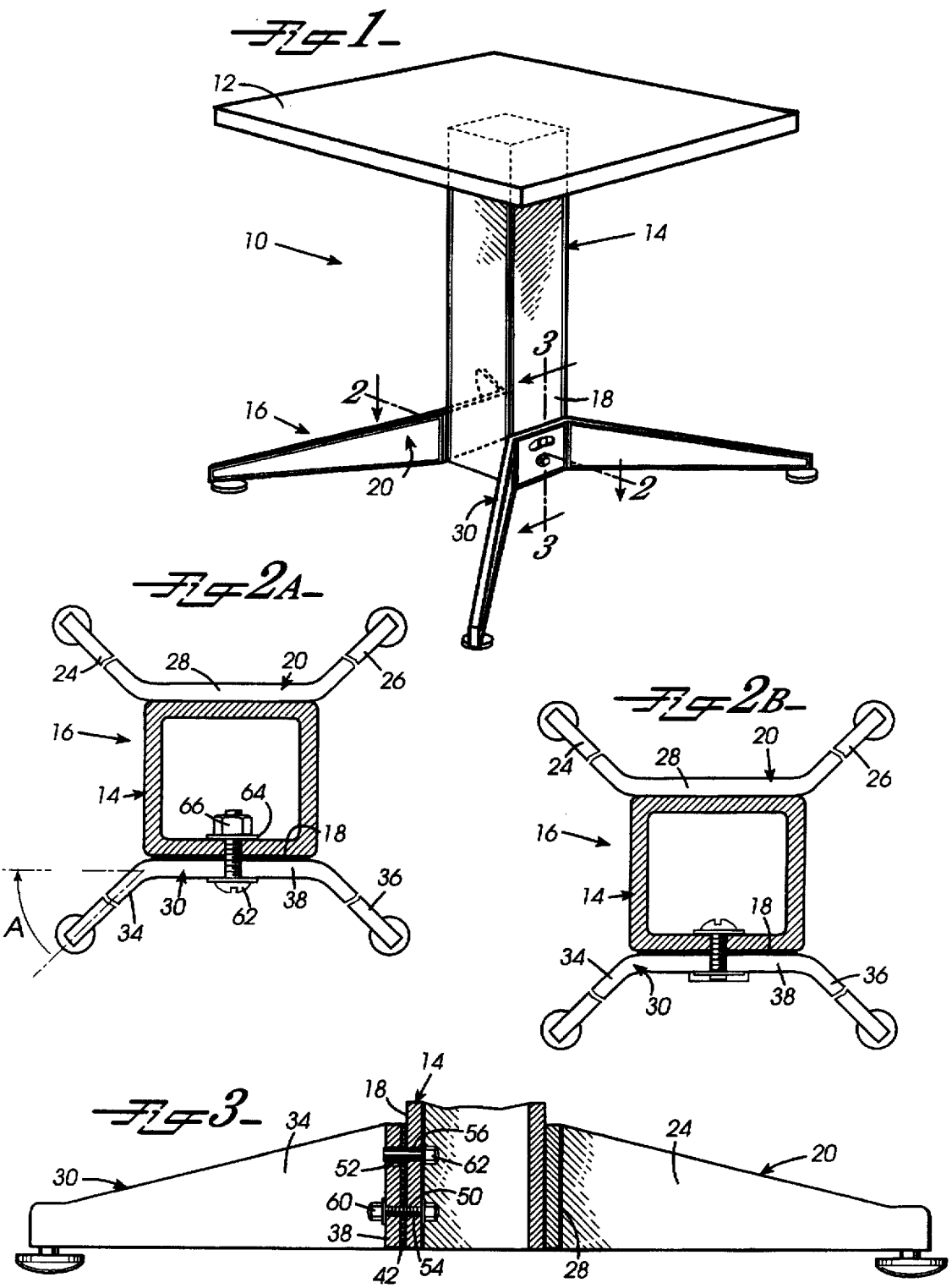

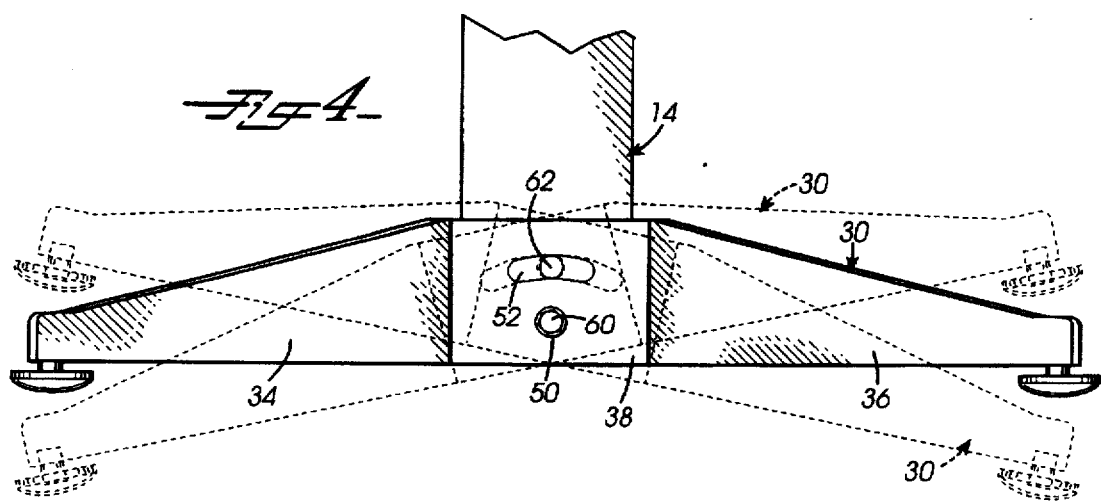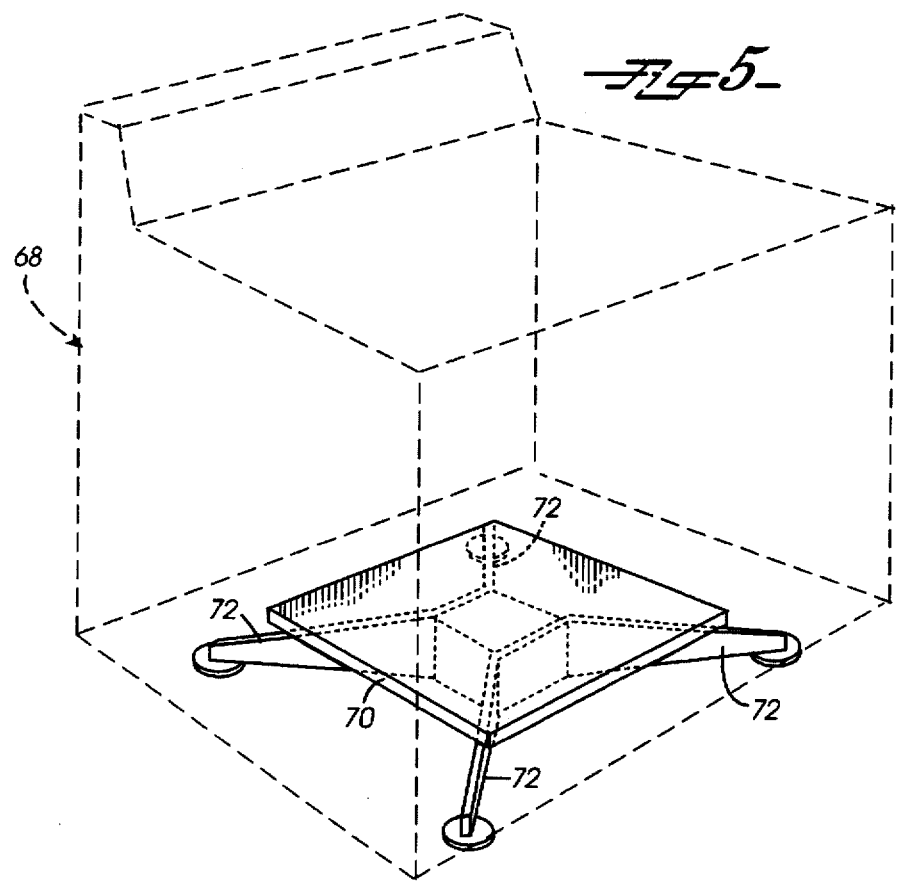

SELF-STABILIZING BASE FOR A TABLE

BACKGROUND OF THE INVENTION

1. Field of the Invention

The present invention relates to legs, supports, bases, and pedestals for furniture, appliances, and similar objects. More specifically, the present invention relates to self-stabilizing bases for various objects.

2. Discussion of Background

Floors are not always flat. In fact, they are rarely flat. Even a well-made floor will become uneven in time as a result of wear, uneven loading, subsidence and the like. Older homes are notorious for having uneven flooring.

Furniture placed on uneven floors may tend to wobble. Three of the furniture legs will rest on the floor and the fourth will be too short. Weight on the part of the furniture supported by the fourth leg will cause the table to rock onto that leg, pivoting on the two adjacent legs and lifting the remaining leg, that opposite the first one. This wobbling is especially aggravating with "café" tables.

Café tables are commonly used by restaurants. They are typically 38 inches square and rest on a single pedestal with four radiating legs. Other variations of this basic design exist. Because of their use as tables for patrons of restaurants, including sidewalk cafés where uneven flooring is very common, it is especially important that café tables not wobble. However, when floors are not flat, wobbling legs are a concern. Also, long, hard use of a table may cause its legs to become uneven.

In the past this concern has been addressed informally with shims (including the use of matchbooks and packets of sugar as temporary shims by patrons of outdoor cafés) and formally by height adjustment screws that must be set for each location. There are also several designs for tables to allow them to be used on uneven flooring. Some of these are not completely satisfactory. For example, a three-legged table, although stable in the sense that it will not wobble, is not as stable as a four-legged table because it is much easier to tip over. Alternatively, there are self-stabilizing, four-legged tables having mechanisms that link two adjacent legs in some way so as to allow them to be pivoted to floor-engaging position.

Several different approaches have been taken to solve the problem of self-stabilizing, four-legged tables. One approach involves the use of levers and pivoting members that connect two of four non-rigidly-attached legs together near their tops, to transfer the upward movement of one to the downward movement of the other so that they both can be floor-engaging. For example, see the device disclosed by Humphreys in U.S. Pat. No. 467,811. Humphreys notes that not all four legs need to have his mechanism, only two. Also, see the design of Henderson (U.S. Pat. No. 3,204,906), which follows this same overall approach.

Use of adjustable legs of a four-legged table is another approach. Although simple in concept, these are both complicated and expensive to manufacture. Mooser, in U.S. Pat. No. 2,793,468, describes a table having two supports, one at each end. Each support has a pair of legs joined so that they can pivot about two perpendicular axes into engagement with the floor. Holding them in place with respect to the rest of the support is a rod extending from the legs, a rod-securing bracket attached to the support, and a nut/bolt arrangement to tighten the support around the legs. Turning a knurled wheel allows adjustment of the length of the rod needed to pivot both legs against the floor.

Still another table-leveling device is taught by Junkunc in U.S. Pat. No. 3,117,392. He modifies an end of a table or desk by incorporating a pivoting base in its support. Two legs on each end terminate inside the pivoting base and rest on a pivot block in the base. Junkunc also notes that only one end of a table or desk needs to have his leveler.

Another approach is used when there is a central support with several "feet" horizontally deployed from the end of the central support. In this circumstance, two of the feet are made to pivot into engagement with the floor. For example, Whitman discloses a self-adjusting base for a café table in U.S. Pat. No. 2,787,087. His base has four feet deployed from the bottom of a central support. Two of the feet are hollowed to receive an "L-shaped" equilizer member that pivots to bring both legs into engagement with the floor. See also the device taught by Ritchie in U.S. Pat. No. 3,814,362.

There remains, however, a need for a low-cost, easy-to-manufacture base to provide self-stabilizing support for an object on uneven floors.

SUMMARY OF THE INVENTION

According to the major aspects of its preferred embodiments, the present invention is a base for use in supporting an object on uneven flooring. By application of pressure on the object, all four legs are pushed into engagement with the floor, regardless of the unevenness of the floor. The present invention, when used as a base for a café table, comprises a central support, two leg assemblies, one attached to one side of the central support rigidly and the other one rotatably attached to the opposing side of the central support. Additionally, the present invention includes means for limiting the rotation of the rotatable leg assembly and means for resisting rotation of that assembly without preventing rotation.

Each leg assembly further comprises two legs connected by a section. The section is attached to the face of the central support and both are complementary, so that there is a substantial amount of surface area between them for engagement of one to the other. There may also be a pad of friction material between the face of the central support and the section of the rotating leg assembly that enables the control of the rotation between the two. The pad is made of a frictional material. By using a bolt, nut and spring washer to tighten the section to the face, the level of effort required to rotate the leg assembly can be adjusted by how much the bolt is tightened. Preferably, that level of effort is at least equal to the load the central support is expected to bear. The amount of rotation is limited by use of a second bolt through an elongated hole in the section. As the rotating leg assembly is rotated, the bolt moves cam-like along the elongated hole but is prevented from rotating farther when it gets to the ends of the elongated hole.

In use, when the table is placed on an uneven floor, pressure is exerted downward on its top so that all four legs engage the floor. One of the two legs on the rotating leg assembly will be "high" until this pressure is applied. Upon application of the pressure, the high leg will come to rest on the floor. The bolt/nut/spring washer, in combination with the friction pad between the section of the rotating leg assembly and the face of the central support, will enable the user to bring all legs into engagement with the floor and prevent the table top from wobbling.

The pivoting leg assembly is a major feature of the present invention. By using a pivoting leg assembly, the present base will enable the high leg to engage the floor, along with the remaining three legs, thus eliminating the wobble.

The use of a substantial surface area coupled with a friction pad between the section of the rotating leg assembly and the face on the central support and a suitable mode of attachment of the rotating leg assembly to the central support to improve the "action" of the rotation—making it friction-controlled—is another important feature of the present invention. If the rotating leg rotates too easily with respect to the central support, then the central support will wobble rather than the legs. The rotation needs to be resisted by friction but should still be smooth. This feature assures that the rotation can be set to the requisite stiffness for the load borne by the table or other object.

The use of the second bolt and the elongated hole to limit rotation is another feature of the present invention. Limiting the amount of rotation prevents use of a table, according to the present invention, on flooring that is excessively uneven and prevents collapse of the table when excessive loads are applied.

The simplicity of construction is another advantage of the present invention. Each leg assembly can be made from a single sheet of flat metal stock bent to form legs at 90° angles with respect to each other, with a flat section therebetween for attachment to the flat facing of the central support.

Other features and advantages will be apparent to those skilled in the art of furniture design from a careful reading of the Detailed Description of Preferred Embodiments, accompanied by the Drawings.

BRIEF DESCRIPTION OF THE DRAWINGS

In the drawings,

FIG. 1 is a perspective view of a table with a base according to a preferred embodiment of the present invention;

FIG. 2A is a top view of the base of the table in FIG. 1, taken along lines 2—2;

FIG. 2B is an alternative arrangement of a base to that presented in FIG. 2A, according to a preferred embodiment of the present invention;

FIG. 3 is a side cross-sectional view of the base shown in FIG. 1, taken along line 3—3;

FIG. 4 is a side view of the rotating leg assembly according to a preferred embodiment of the present invention; and FIG. 5 is a perspective view a base supporting a washing machine, shown in phantom lines, according to a preferred embodiment of the present invention.

DETAILED DESCRIPTION OF PREFERRED EMBODIMENTS

The present invention is a four-legged base that can be used to support objects on uneven flooring. In particular, the base adjusts to the flooring by bringing all four legs into engagement with the floor so that the object does not wobble when loaded or when the load shifts. The present invention will be described and illustrated in connection with a café table, but it will be clear that a great many other objects can also employ the present base. Examples of some of these other objects include appliances such as refrigerators, work benches, and many different types of four-legged furniture.

The present invention does not "level" the table, although some similar devices are described as "self-leveling." If the floor is not even, the present device will simply stabilize the object by bringing all four legs into engagement with the floor. However, the top of the object will not be truly level when the object is stablilized, unless the floor was level and even to begin with.

Turning now to FIG. 1, there is illustrated a table generally indicated by the reference number 10. Table 10 includes a table top 12, a central support 14, and a leg structure 16. In the present invention, table top 12 is the object supported. As with most tables, table 10 has a much larger area than that of the cross section of central support 14, in order to accommodate those seated at it. In the case of other objects, central support 14 may have a larger cross-sectional area, perhaps almost as large as the cross-sectional area of the object supported, as in the case of a refrigerator, for example. The legs that are part of the present invention do not necessarily have to be confined to the cross sectional area of the object but may extend outward beyond it.

Central support 14 is also illustrated as having a square cross-sectional shape. However, central support 14 may have any cross-sectional shape, including rectangular and circular shapes and non-regular shapes. It is important, however, that one side of central support 14 have a face 18 to which a leg assembly can be attached. A square or rectangular central support will have, of course, four faces. A circular central support does not inherently have a face, so one must be formed in its side. The face is preferably planar, but other configurations, as described below, will also work satisfactorily. It is also not required that central support 14 be hollow, as shown in the figures. However, a hollow central support 14 will have advantages in concealing the present invention in a finished product, as will be described in more detail below.

The present base has two leg assemblies: a first leg assembly 20 and a second leg assembly 30, as best seen in FIGS. 2A, 2B and 3. Each leg assembly 20, 30 has a first leg 24, 34, a second leg 26, 36, and a section 28, 38 therebetween and connecting first legs 24, 34 and second legs 26, 36 respectively. Preferably this connection is integral, but legs 24, 26, 34, 36 may be welded, glued, or attached in some other way to sections 28, 38. Most preferably, first leg assembly 20 and second leg assembly 30 are each made of a single piece of flat metal stock that is bent twice, where each leg joins to the section between them at an angle A (FIG. 2A) of approximately 45°, so that the two legs of each leg assembly are 90° apart and section 38 is substantially planar, to complement the shape of face 18.

Second leg assembly 30 is rotatably attached to central support 14 in a manner that will be described more completely below and illustrated in FIG. 4; first leg assembly 20 should be rigidly attached.

The configuration of face 18 is preferably planar. Importantly, face 18 and section 38 must complement each other so that the surface area of engagement is substantial. To complement each other, the shape of face 18 and the shape of section 38 must be such that surface variations on one are matched by the other. Obviously, surface variations must be such that they will not interfere with rotation The rotation of second leg assembly 30 with respect to central support 14 should be smooth and achievable, for example, by applying a pressure to table top 12 equal to or slightly greater than the load table 10 is ultimately to support. If second leg assembly 30 rotates too freely, central support 14 will rotate as much with respect to second leg assembly 30 as table 10 would wobble without the benefit of the present invention. In order to achieve this degree of smoothness and resistance to rotation but without requiring undue effort to bring legs 24, 34 into engagement with the floor, the mode of rotational attachment and the extent and character of the area of engagement between face 18 and section 38 is important. The greater the surface area of engagement, that is, the more "substantial" or extensive it is with respect to the amount of area possible given the specific configuration of face 18 and and section 38 of second leg assembly 30, the easier it will be to achieve and maintain the smooth rotational control required. A more extensive, substantial area of engagement means lower pressure can be used to hold the two together. Lower pressure also facilitates use of materials therebetween to prevent sticking and to enable a range of pressures. Preferably, then, for the engagement to be substantial, section 38 should have essentially the same width as face 18, and face 18 should have a height that is at least equal to the height of section 38. Furthermore, the shapes of these two components should complement one another.

Resistance to relative rotation of leg assembly 30 and central support 14 can be increased and smoothed by placing a friction pad 42 between the two. Pad 42 is made of a material that increases resistance to movement when appropriate force is applied. The use of a pad 42 is especially preferred when central support 14 and leg assembly 30 are made of metal. If made of metal, the transition from a condition of "no resistance to rotation" to one of "resistance to rotation" is abrupt and, therefore, inherently more difficult for control over the relative ease of rotation to be established. By placing a friction pad therebetween, the transition may be made much more gradual, enabling the user, by (1) suitable choice of materials for pad 42 and (2) suitable choice of the mode of attachment of central support 14 to second leg assembly 30 to control the amount of force needed to resist rotation of one with respect to the other. In summary, the desired characteristics of the rotational movement of second leg assembly 30 with respect to central support 14 is achieved using some or all of the following: (1) substantial surface area of engagement, (2) a friction pad 42 of suitable material that provides a suitable level of friction to resist rotation yet does not stick to face 18 and section 38, and (3) the mode of attachment, which is described below. Use of all these will enable the force required for rotation to be set at least equal to the load to be placed on the present base, so that the base can be stabilized by pressing legs 34, 36, of rotating leg assembly 30 into engagement with the floor, but central support 14 will not rotate too freely with respect to rotating leg assembly 30.

First leg assembly 20 is rigidly attached to central support 14, for example, by bolting, welding, or gluing. Second leg assembly 30, on the other hand, is rotatably attached to central support 14. Furthermore, it is preferable to provide means for limiting the rotation of second leg assembly 30 with respect to central support 14. Therefore, in one embodiment, two holes are formed in second leg assembly 30, a first hole 50 that is dimensioned to receive a bolt 60, and a second hole 52 that is elongated so that its minor dimension is just large enough to receive a bolt 62, but its major dimension is longer so that bolt 62 can move laterally in it, in the same manner as a cam follower in a cam race. (See FIG. 4.) Ideally, elongated hole 52 should be curved to describe an arc about first hole 50. The arc of second hole 52 should be just great enough for the largest relative rotation of second leg assembly 30 with respect to central support 14. As a practical matter this arc only needs to be a few degrees, such as ten degrees or less, to allow a five degree rotation in either direction.

There are also two holes formed into face 18 of central support 14: a first hole 54 and a second hole 56. First holes 54 and 56 have the same shape; second hole 56 is not elongated, however, but is circular and dimensioned to receive bolt 62 that also fits into hole 52. Holes 50, 52 and 54, 56 can be aligned, respectively, by moving second leg assembly 30 with respect to central support 14. When aligned, bolts 60, 62 are inserted into holes 50 and 52 respectively, and tightened with a washer and nut, preferably a spring washer 64 and lock nut 66 for bolt 62 (FIG. 2A), to make the force required for tightening second leg assembly 30 to central support 14 more gradual so that the user has more control over the level of force applied.

Although FIG. 3 shows elongated hole 52 in section 38 of second leg assembly 30, it will be clear that this arrangement can be reversed, as indicated by FIG. 2B in comparison to FIG. 2A; that is, elongated hole 52 can be formed in central support 14 rather than in section 38 and that circular hole 56 can be formed in second leg assembly 30 instead of central support 14, and the limited relative rotation will still be obtained. It may be preferable in many applications to make the exterior of second leg assembly 30 look as much like first leg assembly 20, and for both to have a finished appearance by incorporating as much of the mechanical aspects of the present invention into the interior of a hollow central support. Also, if bolts 60, 62 are inserted from inside a hollow central support 14, the holes 50 and 52, respectively, can simply be threaded or welded in the recesses so that the ends of bolts 60, 62 do not show from the outside of central support 14. These variations, cosmetic or otherwise, will be clear to those of ordinary skill in the art once the present invention is fully understood.

FIG. 5 illustrates the present invention with an appliance 68, which should be stablized for best performance. The central support for this embodiment, generally indicated by reference number 70, is larger in cross sectional area, shorter in height, and its legs 72 correspondingly smaller than would be the case for table 10.

In use, bolts 60, 62 are tightened sufficiently so that, when table 10 is placed on uneven flooring and the user pushes down firmly but without strain, second leg assembly 30 rotates about an axis perpendicular to face 18 of central support 14 and through bolt 60 until first and second legs 34, 36 engage the floor along with legs 24, 26 but not more than defined by the limits of elongaged hole 52. Then table 10 will not wobble.

It will be apparent to those skilled in the art to which the invention pertains that many modifications and substitutions can be made in the details of the preferred embodiments described above without departing from the spirit and scope of the invention, as defined by the appended claims.

What is claimed is:

1. A base for supporting an object on an uneven floor, said base comprising:

a central support having a first side and an opposing second side, said second side having a face;

a first leg assembly attached to said first side;

a second leg assembly including a first leg, a second leg and a section therebetween for connecting said first leg to said second leg, said section engaging said face of said central support;

means for rotatably attaching said section of said second leg assembly to said face of said central support so that said second leg assembly rotates with respect to said central support; and means carried between said section and said face for resisting rotation of said second leg assembly with respect to said central support.

2. The base as recited in claim 1, further comprising means carried by said section for limiting rotation of said second leg assembly with respect to said central support.

3. The base as recited in claim 1, further comprising means carried by said face for limiting rotation of said second leg assembly with respect to said central support.

4. The base as recited in claim 1, wherein said face and said section have an area of engagement, said face and said section complementing each other so that said area of engagement is substantial.

5. The base as recited in claim 1, wherein said face and said section complement each other, and wherein said base further comprises means carried by said section for limiting rotation of said second leg assembly with respect to said central support.

6. The base as recited in claim 1, wherein said face and said section complement each other, and wherein said base further comprises means carried by said face for limiting rotation of said second leg assembly with respect to said central support.

7. The base as recited in claim 1, wherein said face and said section complement each other.

8. The base as recited in claim 1, wherein said first leg, said second leg and said section are integral.

9. A base for supporting an object on an uneven floor, said base comprising:

a central support having a first side and an opposing second side, said second side having a face;

a first leg assembly attached to said first side;

a second leg assembly including a first leg, a second leg and a section therebetween for connecting said first leg to said second leg, said section engaging said face of said central support;

means for rotatably attaching said section of said second leg assembly to said face of said central support so that said second leg assembly rotates with respect to said central support;

means carried by said base for limiting rotation of said second leg assembly with respect to said central support; and means located between said section and said face for resisting rotation of said second leg assembly with respect to said central support.

10. The base as recited in claim 9, wherein said face and said section are substantially planar.

11. The base as recited in claim 9, wherein said first leg, said second leg and said section are integral.

12. The base as recited in claim 9, wherein said section has an elongated hole formed therein and said face has a hole formed therein, said elongated hole of said section and said hole of said face being aligned and wherein said limiting means further comprises a bolt passing through said elongated hole of said section and said hole of said face, said bolt limiting rotation of said face to said section when said bolt reaches the ends of said elongated hole.

13. The base as recited in claim 9, wherein said face has an elongated hole formed therein and said section has a hole formed therein, said elongated hole of said face and said hole of said section being aligned and wherein said limiting means further comprises a bolt passing through said elongated hole of said face and said hole of said section, said bolt limiting rotation of said face to said section when said bolt reaches the ends of said elongated hole.

14. The base as recited in claim 9, wherein said first leg assembly is rigidly attached to said central support.

15. A base for supporting an object on an uneven floor, said base comprising:

a central support having a first side and an opposing second side, said first side having a first face, said second side having a second face, said first and said second faces being substantially planar;

a first leg assembly attached to said first face of said first side, said first leg assembly having a first leg, a second leg and a section therebetween for connecting said first leg assembly to said first face of said central support, said section of said first leg assembly being substantially planar;

a second leg assembly attached to said second face of said central support, said second leg assembly having a first leg, a second leg and a section therebetween for connecting said first leg to said second leg, said section of said second leg assembly engaging said second face of said central support, said section of said second leg assembly being substantially planar;

means for rigidly attaching said section of said first leg assembly to said first face of said central support;

means for rotatably attaching said section of said second leg assembly to said second face of said central support so that said second leg assembly rotates with respect to said central support;

means carried by said base for limiting rotation of said second leg assembly with respect to said central support; and means located between said section of said second leg assembly and said second face of said central support for resisting rotation of said second leg assembly with respect to said central support.

16. The base as recited in claim 15, whereto said first leg, said second leg and said section of said first leg assembly are integral and said first leg, said second leg and said section of said second leg assembly are integral.

17. The base as recited in claim 15, wherein said section of said second leg assembly means has an elongated hole formed therein and said second face of said central support has a hole formed therein, said elongated hole of said section and said hole of said second face being in registration, and wherein said limiting means further comprises a bolt passing through said elongated hole of said section and said hole of said second face, said bolt limiting rotation of said second face of said central support with respect to said section of said second leg assembly when said bolt reaches the ends of said elongated hole.

18. The base as recited in claim 15, wherein said second face of said central support has an elongated hole formed therein and said section of said second leg assembly has a hole formed therein, said elongated hole of said second face and said hole of said section being in registration, and wherein said limiting means further comprises a bolt passing through said elongated hole of said second face and said hole of said section, said bolt limiting rotation of said second face of said central support with respect to said section of said second leg assembly when said bolt reaches the ends of said elongated hole.

\* \* \* \* \*